(12) United States Patent
Robertsson (10) Patent No.: US 7,068,568 B2
(45) Date of Patent: Jun. 27, 2006

(54) METHOD OF PROCESSING SEISMIC DATA

(75) Inventor: Johan O. A. Robertsson, Oslo (NO)

(73) Assignee: WesternGeco, L.L.C., Houston, TX (US)

( * ) Notice: Subject to any disclaimer, the term of this patent is extended or adjusted under 35 U.S.C. 154(b) by 367 days.

(21) Appl. No.: 10/311,073

(22) PCT Filed: Jun. 27, 2001

(86) PCT No.: PCT/IB01/01150

§ 371 (c)(1),
(2), (4) Date: Dec. 12, 2002

(87) PCT Pub. No.: WO02/01254

PCT Pub. Date: Jan. 3, 2002

(65) Prior Publication Data

US 2003/0147306 A1    Aug. 7, 2003

(30) Foreign Application Priority Data

Jun. 29, 2000   (GB) .................................. 0015810.5

(51) Int. Cl.
*G01V 1/38* (2006.01)
(52) U.S. Cl. .............................. 367/24; 367/15; 367/21
(58) Field of Classification Search .................. 367/15, 367/17, 24, 38, 19–21; 702/17
See application file for complete search history.

(56) References Cited

U.S. PATENT DOCUMENTS

| | | | | |
|---|---|---|---|---|
| 4,486,865 A | | 12/1984 | Ruehle | |
| 4,752,916 A | * | 6/1988 | Loewenthal | 367/24 |
| 4,979,150 A | * | 12/1990 | Barr | 367/24 |
| 5,051,961 A | * | 9/1991 | Corrigan et al. | 367/24 |
| 5,193,077 A | * | 3/1993 | Weiglein et al. | 367/23 |
| 5,524,100 A | * | 6/1996 | Paffenholz | 367/24 |
| 5,621,699 A | * | 4/1997 | Rigsby et al. | 367/22 |
| 5,757,720 A | | 5/1998 | Soubaras | |
| 5,835,451 A | * | 11/1998 | Soubaras | 367/24 |
| 6,101,448 A | * | 8/2000 | Ikelle et al. | 702/17 |

FOREIGN PATENT DOCUMENTS

| | | | |
|---|---|---|---|
| CA | 2205426 | * | 5/1997 |
| CA | 2205426 | | 11/1997 |
| EP | 0884608 A2 | | 12/1998 |

OTHER PUBLICATIONS

Soubras. Calibration and Deghosting of ocean bottom hydrophone and geophone instruments. EAGE 58th Conference and Technical Exhibition. Jun. 1996.*

* cited by examiner

*Primary Examiner*—Jack Keith
*Assistant Examiner*—Scott A. Hughes
(74) *Attorney, Agent, or Firm*—WesternGeco, L.L.C.

(57) ABSTRACT

A method of de-ghosting seismic data acquired in a marine seismic survey comprises estimating $\partial_z p$ (where p is the fluid pressure) from a time-derivative of p and a derivative of p in a horizontal direction such as the x-direction. The time-derivative of p and the derivative of p in the horizontal direction can be readily obtained from the acquired seismic data, and are used to provide an improved estimate of $\partial_z p$ which, in general, cannot be directly determined from the acquired seismic data.

Once $\partial_z p$ has been estimated it can be used to de-ghost the acquired seismic data.

22 Claims, 5 Drawing Sheets

METHOD OF PROCESSING SEISMIC DATA

BACKGROUND OF THE INVENTION

1. Field of the Invention

This present invention relates to a method of processing seismic data and, in particular, to a method of processing marine seismic data to, reduce the effects of "ghost reflections". The present invention can be applied to processing both marine seismic data acquired in a flat sea and marine seismic data acquired in a rough sea. The present invention also relates to processing seismic data so as to estimate the depth of a seismic receiver, or so as to monitor the accuracy of a seismic receiver.

2. Description of the Related Art

Figure 1:
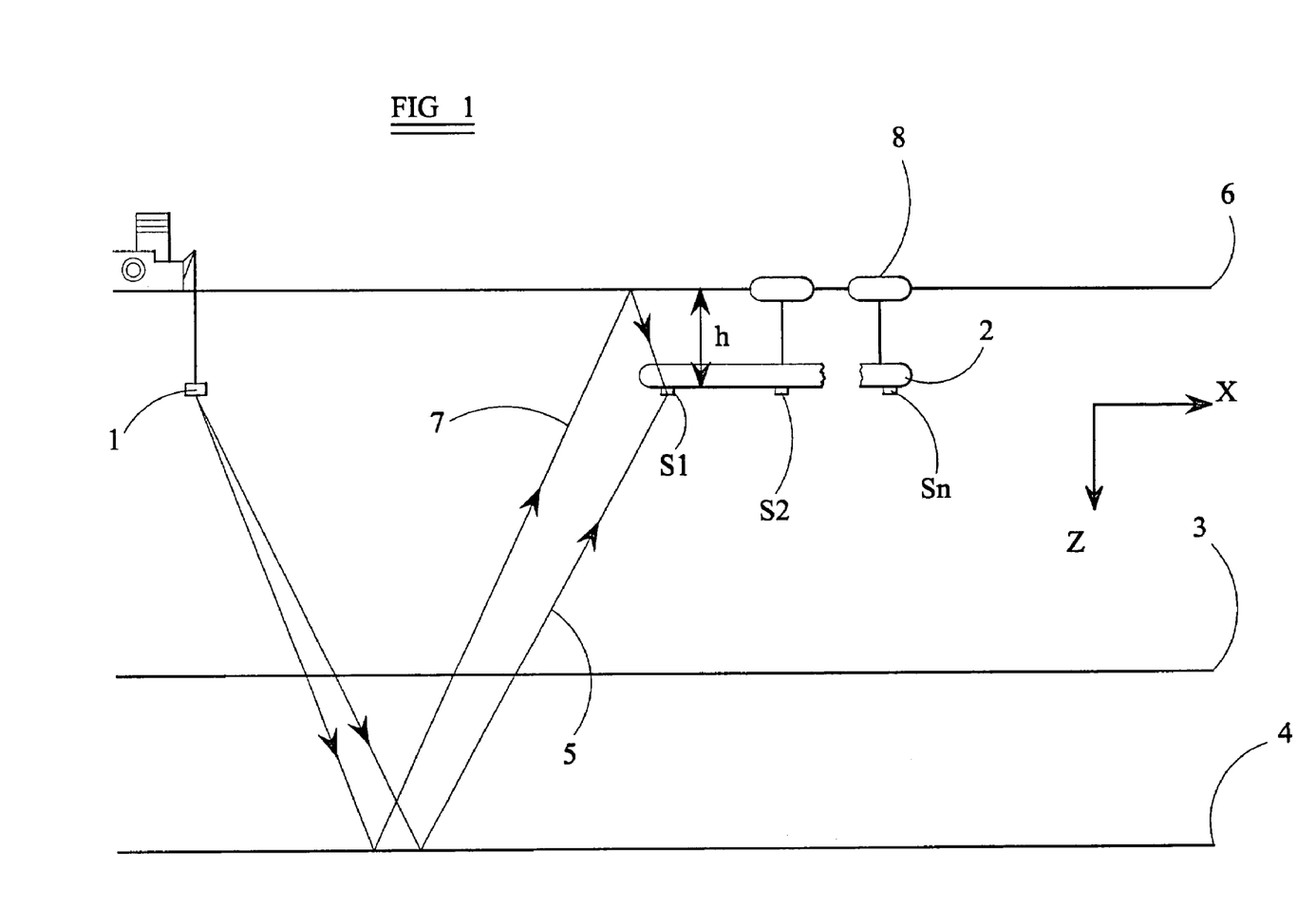
FIG. 1 is a schematic view of a marine seismic survey illustrating the production of ghost reflections.

FIG. 1 is a schematic diagram of a marine seismic survey in which seismic energy is emitted from a source 1 and detected by a seismic receiver 2 at a depth h below the surface 6 of the sea. Energy emitted from the source is reflected by the seabed 3 or by a reflector 4 below the seabed 3 and is then detected by the receiver. This path of seismic energy is labelled 5 in FIG. 1. Information about the geological structure of the earth's interior can be derived from the reflected seismic energy incident on the receiver.

The seismic receiver 2 shown in FIG. 1 is a streamer, which is a type of seismic receiver that is frequently used in marine seismic surveying. A streamer contains a plurality of sensors $S_1, S_2 \ldots S_N$ such as pressure sensors and/or particle velocity sensors distributed along its length, which may be some hundreds of meters, and is thus able to measure the reflected seismic energy at a number of points simultaneously. A streamer is generally suspended from one or more floats 8, so that all the receivers of the streamer are at the same depth in a flat sea.

In addition to the desired path 5 of seismic energy shown in FIG. 1, other seismic energy paths will occur as a result of seismic energy being reflected or scattered from the sea surface 6. These paths are known as "ghost reflections". For example, reference 7 in FIG. 1 shows a ghost reflection in which the seismic energy reflected by the reflector 4 is not directly incident on the receiver 2, but undergoes a further reflection at the sea surface 6 before reaching the receiver. Down-going sea-surface ghost reflections are an undesirable source of contamination of seismic data, since they obscure the interpretation of the desired up-going reflections from the earth's interior.

Ghost reflections also arise from sea surface reflections or scattering near the source 1. The overall seismic energy signal received at a point below the source will contain a component that has come direct from the source and a component that has come via a reflection or scattering at the sea surface.

SUMMARY OF THE INVENTION

Removing the ghost reflections from seismic data is for many experimental configurations equivalent to up/down wavefield separation of the recorded data. In such configurations the down-going part of the wavefield represents the ghost signal and the up-going wavefield represents the desired signal. The up/down wavefield separation can be achieved by applying a suitable filter to the seismic data.

The present invention provides a method of de-ghosting seismic data, the method comprising the steps of:

a) obtaining seismic data using a seismic source and a seismic receiver disposed within a fluid medium;

b) determining a derivative with respect to time of the fluid pressure at a point in the vicinity of a selected one of the seismic source and the receiver;

c) determining a derivative with respect to a first direction of the fluid pressure at a point in the vicinity of the selected one of the seismic source and receiver;

d) determining a derivative with respect to a second direction of the fluid pressure at a point in the vicinity of the selected one of the seismic source and receiver from the results of steps (b) and (c); and e) processing the seismic data using the derivative with respect to a second direction of the fluid pressure, thereby to reduce the effects in the processed seismic data of seismic energy reflected and/or scattered at the sea surface.

In a typical marine seismic survey, the time-derivatives of the pressure and the derivatives in one direction, for example the horizontal direction, are readily available, whereas the derivatives in other directions, for example the vertical direction, are not directly known and have to be estimated. The present invention uses the readily available derivatives to provide a better estimate of a derivative that is not directly known, and this allows more accurate de-ghosting of the seismic data.

In a preferred embodiment step (a) comprises obtaining seismic data at two different depths below the surface of the fluid medium, and in a particularly preferred embodiment step (a) comprises measuring the fluid pressure at two different depths below the surface of the fluid medium. This allows the derivative of the de-ghosting step to be further improved.

In an alternative preferred embodiment, step (a) comprises measuring the fluid pressure and the particle velocity. If the depth is known, this embodiment allows the pressure and particle velocity sensors to be monitored. For example, the particle velocity can be computed from the depth and the measured pressure values, and the computed value may then be compared with the measured values of the particle velocity. Alternatively, the depth may be estimated from the measured values of the particle velocity and pressure.

A second aspect of the present invention provides a method of calibrating a seismic receiver as claimed in claim 20. This method enables the accuracy of measurement of particle velocity to be monitored.

A third aspect of the present invention provides a method of calibrating a seismic receiver as claimed in claim 22, and a fourth aspect of the invention relates to a method of determining the depth of a seismic receiver as claimed in claim 24. These aspects of the invention relate to a receiver that can measure both the particle velocity and the fluid pressure.

Other features of the invention are set out in the dependent claims.

BRIEF DESCRIPTION OF THE DRAWINGS

Preferred embodiments of the present invention will now be described by way of illustrative example with reference to the accompanying figures in which.

DETAILED DESCRIPTION

The equation relating pressure p to particle velocity v n an acoustic medium with a bulk modulus K is:

$$\dot{p} = -K \nabla \cdot \overline{v} \quad (1)$$

In equation (1), $\dot{p}$ denotes the time-derivative of p. The pressure p and particle velocity v are also related by the equation of motion, which has the following form $$\overline{v} = -\frac{1}{\rho} \nabla p \quad (2)$$

Here, p is the density of the acoustic medium. The equation of motion (2) and equation (1) together complete the set of first order partial differential equations describing acoustic wave propagation. These equations can be combined to give the well-known, second-order, acoustic wave equation:

$$\ddot{p} = \alpha^2 \nabla^2 p \quad (3)$$

In equation (3), $\alpha = \sqrt{K/\rho}$ is the wave propagation speed in the acoustic medium.

Since the curl of the gradient of an acoustic wavefield is zero (this being a fundamental vector relation), equation (2) yields:

$$\nabla \times \overline{v} = \overline{0} \quad (4)$$

A preferred embodiment of the invention relating to de-ghosting a streamer located in the vicinity of the sea-surface will now be described. In this embodiment the streamer is provided with a plurality of pressure sensors distributed along its length. Although the propagation of seismic energy is three-dimensional in any real seismic surveying arrangement, this example will consider only 2D wave propagation in the x-z plane (z increases downwards, as indicated in FIG. 1) for clarity of explanation. The invention can, however, be applied to full three-dimensional propagation of seismic energy.

It has been reported, for example in co-pending UK patent application No 9906456.0, that de-ghosting of seismic data can be carried out if the vertical derivative of pressure $\partial_z p$ is known. Thus, it is necessary to compute the vertical derivative of pressure along the streamer at a point $(x_0, z_0)$. This can be achieved by writing an estimate of the vertical derivative of pressure as a Taylor expansion in the z-direction of p around $(x_0, z_0)$. After rearranging the terms of the Taylor expansion we obtain:

$$\partial_z p(x_0, z_0) = \frac{p(x_0, z_0) - p(x_0, z_0 - h)}{h} + \frac{h}{2} \partial_{zz} p(x_0, z_0) + O(h^2) \quad (5)$$

In equation (5), h is the vertical distance of the streamer at point $(x_0, z_0)$ below the sea-surface, $\partial_z$ denotes a first-order derivative in the z-direction and $\partial_{zz}$ denotes a second order derivative. The $O(h^2)$ term shows that the largest error terms have factor $h^2$ in them and can therefore be ignored to a reasonably accurate approximation.

In the case of a marine seismic survey that has a single streamer it is not possible to measure $\partial_{zz} p$ directly. Pressure is measured only at the streamer, and this may be at a constant depth in a flat sea. However, the second-order derivative of p in the vertical direction, $\partial_{zz} p(x_0, z_0)$, can be related to the time derivative of pressure and to the derivative of pressure in a direction along the streamer, which is assumed to be horizontal, by using the wave equation. This allows us to increase the accuracy of a derivative estimate. A correction of this type is known as a Lax-Wendroff correction in the synthetic finite-difference literature, and is described by Lax and Wendroff in "Difference Schemes for Hyperbolic Equations with high order accuracy", Comm. Pure Appl. Math Vol. 27 (1964), and by Blanch and Robertsson in "Geophysical Journal International", Vol. 131, pp381–386 (1997).

Thus, according to the invention Equation (3) is used to convert derivatives that are not known into derivatives that can be computed from the measured pressure data. From equation (3) the following relationship can be obtained:

$$\partial_{zz} p(x_0, z_0) = \frac{1}{\alpha^2} \ddot{p}(x_0, z_0) - \partial_{xx} p(x_0, z_0) \quad (6)$$

By substituting the above formula for $\partial_{zz} p$, Equation (5) then becomes:

$$\partial_z p(x_0, z_0) = \frac{p(x_0, z_0)}{h} + \frac{h}{2\alpha^2} \ddot{p}(x_0, z_0) - \frac{h}{2} \partial_{xx}(x_0, z_0) + O(h^2) \quad (7)$$

Here we have made use of the fact that the pressure vanishes at the sea-surface:

$$p(x_0; z_0 - h) = 0.$$

The significance of equation (7) is it does not contain $\partial_{zz} p$. In equation (7), $\partial_z p$ is expressed in terms of the derivative of the pressure with respect to time and the derivative of the pressure with regard to the x-direction (the horizontal direction). Both of these quantities can be readily estimated from the available data. The time-derivative of the pressure can be readily computed from pressure measurements made by a sensor over time. Moreover, as noted above a streamer contains a plurality of pressure sensors disposed along its length, and the derivative of the pressure in the x-direction can be readily computed from pressure measurements made at a given time by adjacent pressure sensors along the streamer.

Equation (7) also provides a means of computing both the x-component and the z-component of particle velocity along the streamer, using equation (2), provided that the streamer depth is known at all times.

The derivatives with respect to x, $\partial_x p$, in the expression for $v_x$ derived from equation (2) and $\partial_{xx} p$ in equation (7), can be computed by differentiating pressure measurements along the streamer. As described in co-pending UK patent application No 9906456.0, computing $\partial_z p$ enables the seismic data to be de-ghosted. Applying the following filter to the seismic data provides de-ghosting, valid for all incidence angles:

$$\tilde{p} = \frac{1}{2}\left(p + \frac{1}{ik_z}\partial_z p\right) \quad (8)$$

The variable $\bar{p}$ denotes the recorded up-going pressure (deghosted), i is the square root of −1, $k_z = \sqrt{(w/\alpha)^2 - k_x^2}$ is the vertical wavenumber, $k_x$ is the horizontal wavenumber, and w is the angular frequency.

The method for estimating $\partial_z p$ according to the invention in principle is independent of the roughness of the sea, as is the deghosting step described in equation (8).

Thus, according to the present invention, the derivative in the z (vertical) direction of the pressure is determined from the pressure measurements made along a horizontal line. Once the derivative of the pressure in the z direction has been calculated, the seismic data can be de-ghosted using equation (8).

FIGS. 3(a) to 6(b) compare results of the present invention with results obtained by a prior art method. These figures are simulations obtained using a flat sea surface or using a rough sea-surface having the profile shown in FIG. 2. It will be seen that the rough sea surface of FIG. 2 has a significant wave height of around 2 m. In the simulation it was assumed that the pressure is being recorded by a horizontal streamer at the points marked with an asterix, namely at x=−12.5 m, x=−137.5 m, x=−262.5 m and x=−387.5 m. The source is a 50 Hz zero-phase explosive source located at x=0 and at a depth of 50 m.

Figure 3A:
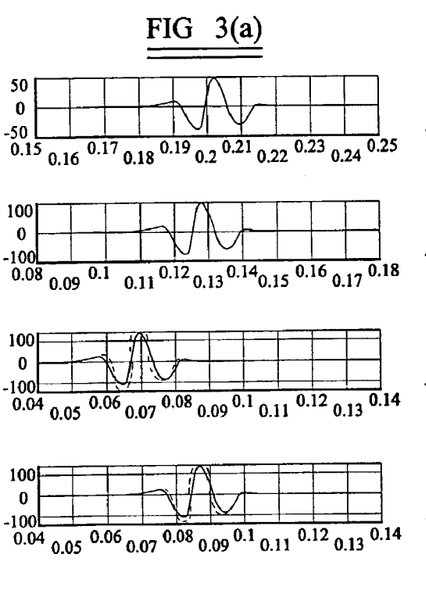
FIG. 3(a) shows the results of a prior art de-ghosting method for a streamer depth of 3.5 m in a flat sea.
Figure 3B:
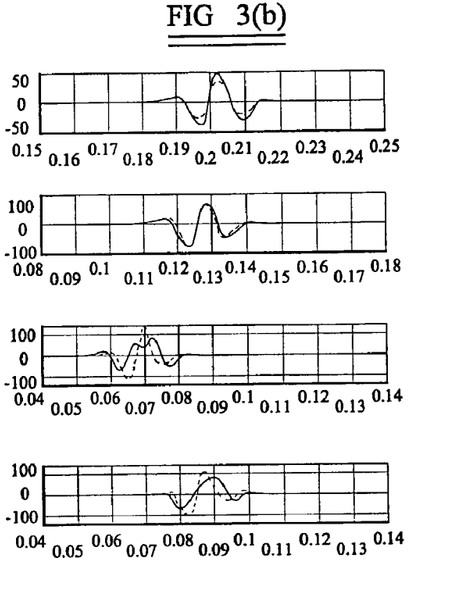
FIG. 3(b) shows the results of a prior art de-ghosting method for a streamer depth of 5.5 m in a flat sea.

FIGS. 3(a) and 3(b) show a comparison between $\partial_z p$ calculated explicitly using a finite-difference method (solid line) and an estimate calculated without a Lax-Wendroff correction (broken lines). The traces in each figure correspond to recording locations x=−12.5 m (uppermost trace), x=−137.5 m, x=−262.5 m, and x=−387.5 m (lowest trace).

In FIGS. 3(a) and 3(b) $\partial_z p$ was calculated simply by dividing the pressure recorded by the sensor on the streamer by the vertical distance between the recording location and the sea-surface (as noted above, the pressure becomes zero at the sea-surface). Thus, this approximation assumes that $\partial_z p$ is constant between the sea-surface and the streamer. FIG. 3(a) shows the results of a streamer depth of 3.5 m, and FIG. 3(b) shows the results for a streamer depth of 5.5 m. It will be seen that computing $\partial_z p$ by the approximation of dividing the recorded pressure at the streamer by the vertical distance between the recording location and the sea-surface is not particularly accurate.

Figure 4A:
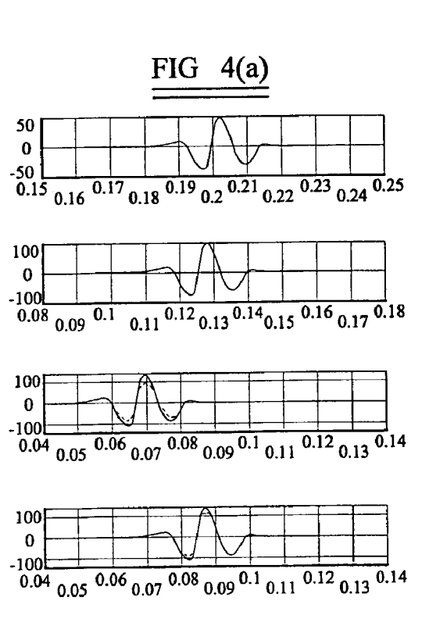
FIG. 4(a) shows the results of a de-ghosting method according to a first embodiment of the present invention for a streamer depth of 3.5 m in a flat sea.
Figure 4B:
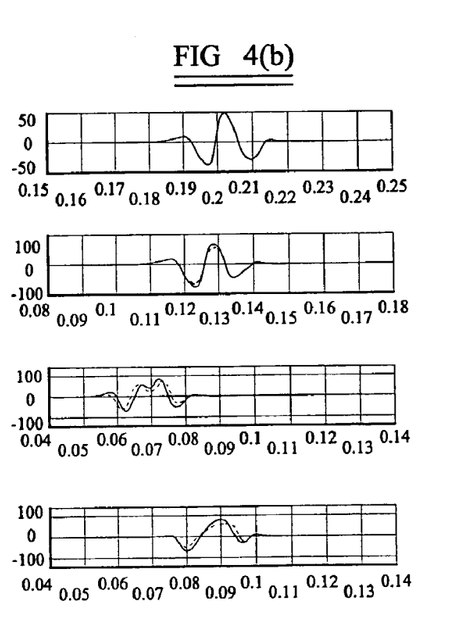
FIG. 4(b) shows the results of a de-ghosting method according to the first embodiment of the present invention for a streamer depth of 5.5 m in a flat sea.

FIGS. 4(a) and 4(b) again relate to a flat sea and show (in dashed lines) results of a method of the present invention in which $\partial_z p$ was calculated using equation (7) above compared with the results (solid lines) of computing $\partial_z p$ using a finite-difference calculation. It will be seen that this method of the present invention provides a much more accurate estimate of $\partial_z p$ than does the simple geometric averaging used in FIGS. 3(a) and 3(b).

Figure 2:
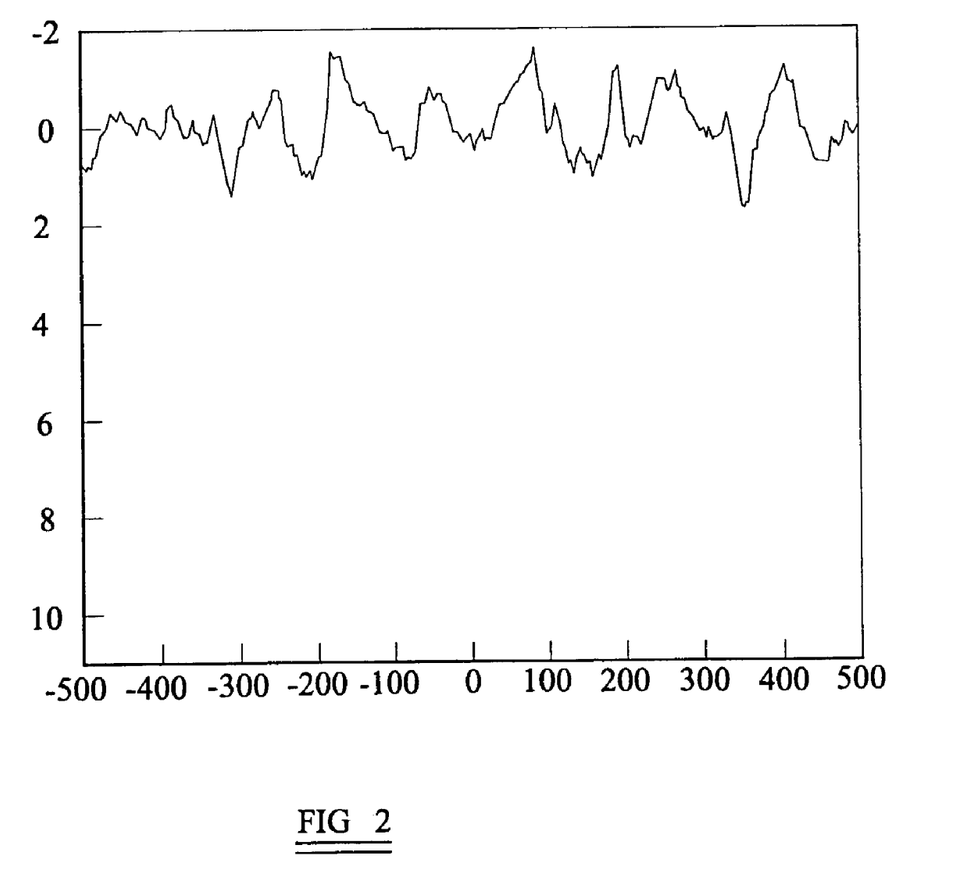
FIG. 2 is a schematic profile view of a rough sea surface.
Figure 5A:
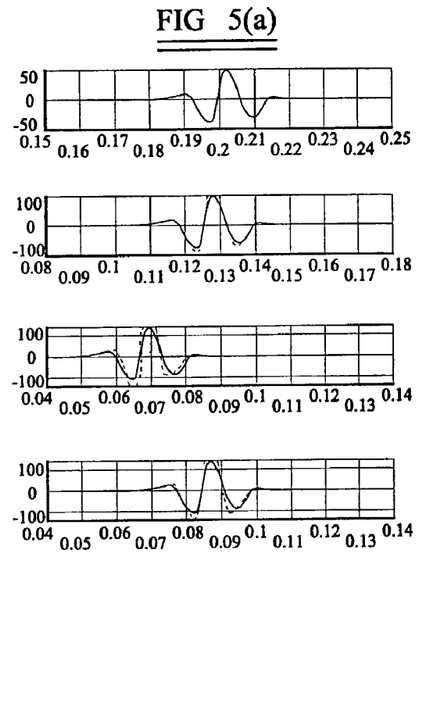
FIG. 5(a) shows the results of a prior art de-ghosting method for a streamer depth of 3.5 m in a rough sea.
Figure 5B:
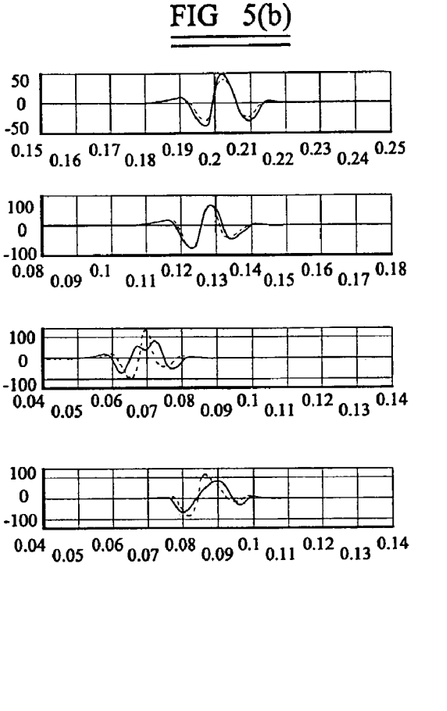
FIG. 5(b) shows the results of a prior art de-ghosting method for a streamer depth of 5.5 m in a rough sea.

FIGS. 5(a) to 6(b) show results of computing $\partial_z p$ for the rough-sea shown in FIG. 2. FIGS. 5(a) and 5(b) show results for the prior art method. In these figures, the results in broken lines are for a calculation of $\partial_z p$ by the prior art method of dividing the pressure recorded by the sensor on the streamer by the vertical distance between the recording location and the sea-surface, while the results in solid lines are a finite-difference calculation for $\partial_z p$.

Figure 6A:
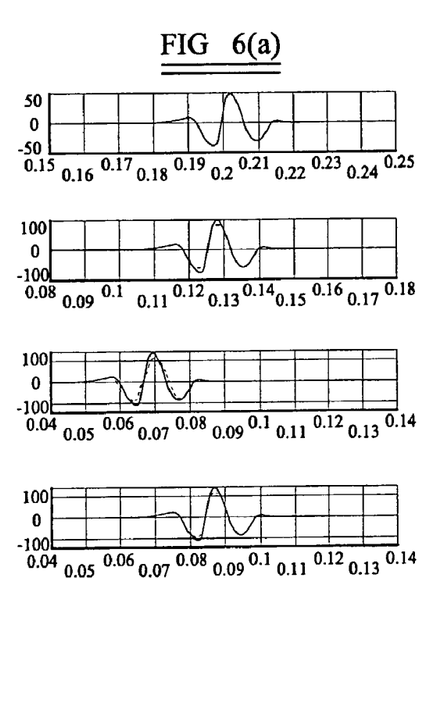
FIG. 6(a) shows the results of a de-ghosting method according to the first embodiment of the present invention for a streamer depth of 3.5 m in a rough sea.
Figure 6B:
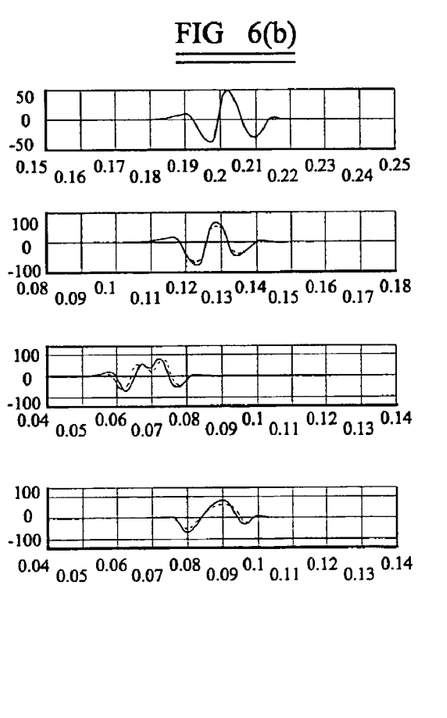
FIG. 6(b) shows the results of a de-ghosting method according to the first embodiment of the present invention for a streamer depth of 5.5 m in a rough sea.

FIGS. 6(a) and 6(b) show results obtained by using the present invention. In these Figures, the solid lines again show the result of a finite-difference calculation for $\partial_z p$, whereas the broken lines show the results of computing $\partial_z p$ using equation (7). It will again be seen that the method of the present invention provides much more accurate estimates of $\partial_z p$ than does the simple geometric averaging method.

In each of FIGS. 4(a), 4(b), 5(a), 5(b), 6(a) and 6(b), the traces correspond to recording locations x=−12.5 m (uppermost trace), x=−137.5 m, x=−262.5 m, and x=−387.5 m (lowest trace).

Since the present invention provides more accurate values of $\partial_z p$, the accuracy of the de-ghosting using the filter of equation (8) will also be improved.

In a further embodiment of the invention, the accuracy of the estimates of $\partial_z p$ is further increased by eliminating the next higher order term in the Taylor expansion, and increasing the accuracy to $O(h^3)$. This requires solving an implicit system of equations for $\partial_z p$ at each frequency:

$$\partial_z\left(1 - \frac{h^2}{6}\left(\frac{w^2}{\alpha^2} + \partial_{zz}\right)\right)p(x_0, z_0) = \frac{p(x_0, z_0)}{h} - \frac{hw^2}{2\alpha^2}p(x_0, z_0) - \frac{h}{2}\partial_{xx}p(x_0, z_0) + O(h^3) \quad (9)$$

One way of solving equation (9) is in the f-x domain using a second order accurate derivative estimate to approximate the term $\partial_{zz}$ on the left-hand side. It may also be preferable to find filter approximations to equation (9) since equation (9) has effectively introduced a pole that could cause instabilities or amplify noise.

Figure 7A:
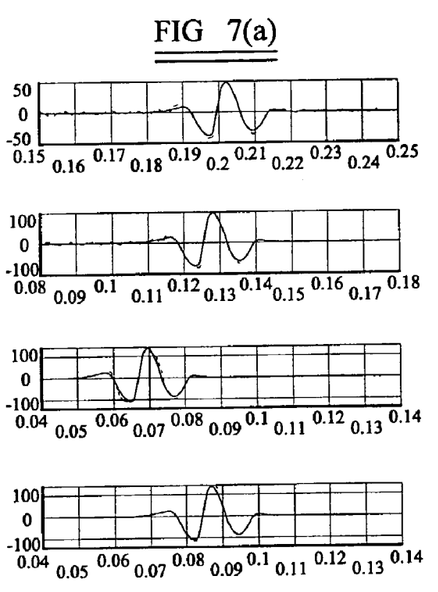
FIG. 7(a) shows the results of a de-ghosting method according to a second embodiment of the present invention for a streamer depth of 3.5 m in a flat sea.
Figure 7B:
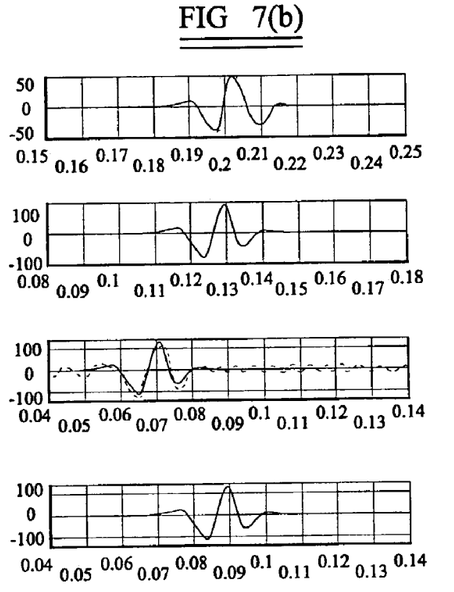
FIG. 7(b) shows the results of a de-ghosting method according to the second embodiment of the present invention for a streamer depth of 3.5 m in a rough sea.

FIGS. 7(a) and 7(b) shows the results of this higher-order de-ghosting method of the present invention. These figures show the result of calculating $\partial_z p$ using a finite-difference method (solid lines) and the results according to the invention of calculating $\partial_z p$ using equation (9) (broken lines). The four traces in each figure again correspond to recording locations of x=−12.5 m (uppermost trace), x=−137.5 m, x=−262.5 m, and x=−387.5 m (lowest trace). FIGS. 7(a) and 7(b) both relate to a streamer depth of 3.5 m, and FIG. 7(a) shows results for a flat sea and FIG. 7(b) shows the results for the rough sea surface of FIG. 2. It will be seen that estimating $\partial_z p$ using equation (9) produces generally good results.

The present invention is applicable to a seismic receiver in the vicinity of the sea-surface, such as a streamer that is towed at a shallow depth below the sea-surface. The maximum allowable depth of the streamer below the sea-surface is generally similar to the maximum separation used to separate the two streamers in a twin streamer configuration, since the largest inaccurate term in both cases is of $O(h^2)$, or of $O(h^3)$ if equation (9) is used. It is preferable that the depth of the streamer below the sea surface does not exceed half the wavelength of seismic energy emitted by the source.

The present invention requires that the vertical distance below the sea surface of each of the sensors distributed along the streamer must be known. A conventional streamer is generally provided with a depth sensor so that an operator can monitor the depth of the sensor. Provided that this depth sensor is sufficiently accurate, it will be possible to use the average depth of the streamer as measured by this sensor as the depth of each of the recording elements. This should provide good results in flat sea conditions. For improved accuracy in rough sea conditions, however, it is preferable that a plurality of depth sensors, such as hydrostatic sensors, are provided on the streamer, so that the distance of each pressure sensor below the instantaneous sea-surface can be recorded. Alternatively, it is possible that the depth of each sensor can be estimated from the acquired seismic data.

The embodiments of the present invention described above relate to a seismic receiver that is provided with sensors for measuring the pressure p of incident seismic energy. As previously noted, however, it is also possible to provide a seismic receiver with sensors for measuring particle velocity $\bar{v}$. An alternative embodiment of the invention is suitable for use with a seismic receiver, for example a streamer, that has both pressure sensors and particle velocity sensors. Such a streamer can directly measure both the fluid pressure p and the particle velocity $\bar{v}$. The quantities p and $\bar{v}$ are not independent from one another, however, but are related by equation (1) or (2), so that there is an extra degree of freedom in the subsequent processing of the seismic data acquired by the streamer.

In one embodiment of the invention, it is assumed that the depth of the streamer is known. This embodiment allows the output from the particle velocity sensors to be compared with the output from the fluid pressure sensors. This comparison can be made, for example, by calculating the particle velocity from the measured values for pressure and from the depth of the streamer, and comparing these calculated values of the particle velocity with the directly measured values for the particle velocity. These values should, of course, be the same if the particle velocity and the fluid pressure have been measured accurately. Alternatively, the pressure can be calculated from the measured values for the particle velocity and from the depth of the streamer, and these calculated values of the pressure can be compared with the directly measured values for the pressure. This process can be considered as calibrating the pressure sensors relative to the particle velocity sensors, and allows the accuracy of the sensors to be monitored.

This process for monitoring the accuracy of the sensors can be carried out while acquired seismic data is being processed by a de-ghosting method of the present invention. Alternatively, it can be carried out on its own, for example to check the sensors at the start of a seismic survey. This allows the extra degree of freedom provided by measuring both p and $\bar{v}$ to be used to calibrate the sensors.

In this embodiment, the depth of the streamer can be estimated, for example from knowledge of the arrangement for suspending the streamer from floats. For improved accuracy, however, it is preferable that the depth of the receiver is measured directly.

In another embodiment of the invention, the extra degree of freedom resulting from the measurement of both p and $\bar{v}$ is used to calculate the distance between each pressure sensor and the sea-surface. In the case of a flat sea, this gives the depth and shape of the streamer.

A further embodiment of the invention again relates to monitoring the accuracy of a streamer that is provided with both fluid pressure and particle velocity sensors. In the embodiment the accuracy of the particle velocity sensors is monitored by using equation (4), which states that the curl of the particle velocity should be identically zero. This in principle allows the particle velocity sensors to be monitored since, if $\bar{v}$ has been measured accurately, then calculating $\nabla \times \bar{v}$ should give zero so that $\nabla \times \bar{v}$ acts as a measure of the quality of the measurement of $\bar{v}$. In practice, however, it has hitherto been difficult to compute $\nabla \times \bar{v}$ with sufficient accuracy for this to be a reliable method of monitoring the particle velocity sensors. Measurements of $\bar{v}$ are available at many points along the streamer but are only available at one depth, and this makes it difficult to compute the derivatives with respect to depth of components of $\bar{v}$.

According to this embodiment of the invention, a Lax-Wendroff correction is used to improve the accuracy of the computation of the derivatives with respect to depth of the components of $\bar{v}$, and thereby improve the accuracy with which $\nabla \times \bar{v}$ can be computed. The wave equation (3) can alternatively be written in terms of $\bar{v}$ rather than p, and using a Lax-Wendroff correction enables the derivative with respect to depth of the components of $\bar{v}$ to be expressed in terms of derivatives with respect to time and derivatives with respect to distance along the streamer. This enables the derivative with respect to depth of the components of $\bar{v}$ to be computed with greater accuracy; this is analogous to the increase in accuracy of computing $\partial_{zz}p$ in previous embodiments.

A further embodiment of the invention is for use with a configuration in which two streamers are towed one above the other in the vicinity of the sea-surface. In this configuration, the pressure is measured at the level of each streamer, and it is also known that the pressure at the sea-surface is zero. This receiver configuration therefore provides sufficient information to enable the second-derivatives of pressure in both the horizontal direction and the vertical direction to be calculated from the measured pressure data. It is thus possible to determine $\partial_z p$ directly from equation (5), since all the terms on the right-hand side of equation (5) can be computed directly from the measured pressure data. In this embodiment, the wave equation (3) which relates spatial derivatives of p to time derivatives of p, is not required in the computation of $\partial_z p$, and can be used to provide a constraint on the streamer depth or on the streamer separation in a de-ghosting step, since limits on the streamer depth or streamer separation can be determined.

Alternatively in this embodiment of the invention, a Lax-Wendroff relation can be used to increase the accuracy of the estimate of the vertical derivative between the streamers. This will allow the streamers to be towed further apart from each other while properly handling higher frequencies in the data. For this situation, the depth derivative is centred at a depth midway between the depths of the two streamers so that the Taylor expansion of the approximation takes the form:

$$\partial_z p(x_0, z_0) = \tag{10}$$

$$\frac{p(x_0, z_0 + h/2) - p(x_0, z_0 - h/2)}{h} - \frac{h^2}{24}\partial_{zzz}p(x_0, z_0) + O(h^4)$$

In Equation (10), h is the vertical separation between the two streamers.

Again, by using equation (3) to write $\partial_{zzz}p$ in terms of derivatives with respect to time or the x-direction, it is possible to obtain an implicit system of equations to solve for $\partial_z p$.

The embodiments of the present invention described above have related to the de-ghosting the signal recorded at the receiver. The invention can, however, also be used for source-side de-ghosting. In principle this could be done by directly measuring the fluid pressure at the source, but in practice it is possible to make use of the principle of reciprocity to avoid the need to do this.

The principle of reciprocity is a fundamental principle of wave propagation, and states that a signal is unaffected by interchanging the location and character of the sources and receivers. For example, if a surveying arrangement with a seismic source at point A and a receiver array at point B gives a certain signal at the receiver array, then using a single receiver at point A and a source array at point B would lead to the same signal, provided that the source array corresponds to the receiver array. (By "corresponds", it is meant that the source array contains the same number of sources as the receiver array has receivers, and that the sources in the source array are arranged in the same positions relative to one another as the receivers in the receiver array).

In consequence of the principle of reciprocity, the signal emitted by an array of seismic sources can be de-ghosted by making measurements using a receiver array, whether the seismic sources are actuated simultaneously or consecutively. The recorded signal is analogous to that recorded in a reciprocal arrangement where the source and receiver locations are interchanged. The method outlined hereinabove can therefore also be applied to the source array that it is desired to de-ghost. The signal produced at the receiver array by an array of a plurality of seismic sources is measured, and a de-ghosting filter is derived from this measured signal. By the principle of reciprocity, this filter can be used to de-ghost the signal emitted by the source array.

The present invention can provide good results in source-side de-ghosting, since the depth of the source(s) in a typical marine seismic survey is generally well-known, for example because the source(s) is/are suspended from a boat by a known length of cable. The present invention can particularly be applied to a full three-dimensional VSP (vertical seismic profiling) acquisition pattern, where a large number of seismic sources are generally employed in a relatively small area. The full three-dimensional version of the present invention can then be applied efficiently.

The methodology of the present invention can also be used to design seismic source arrays that have two or more marine vibrators, air guns, or water guns.

The invention claimed is:

1. A method of de-ghosting seismic data, the method comprising the steps of:
   a) obtaining seismic data using a seismic source and a seismic receiver disposed within a fluid medium;
   b) determining a derivative with respect to time of the fluid pressure at a point in the vicinity of a selected one of the seismic source and the receiver;
   c) determining a derivative with respect to a first direction of the fluid pressure at a point in the vicinity of the selected one of the seismic source and receiver;
   d) determining a derivative with respect to a second direction of the fluid pressure at a point in the vicinity of the selected one of the seismic source and receiver from the results of steps (b) and (c); and
   e) processing the seismic data using the derivative with respect to a second direction of the fluid pressure, thereby to reduce the effects in the processed seismic data of seismic energy reflected and/or scattered at the sea surface.

2. A method as claimed in claim 1 wherein the derivative of the fluid pressure with respect to the second direction is determined from the derivative with respect to time of the fluid pressure and from the derivative with respect to the first direction of the fluid pressure using the equation $$\ddot{p} = \alpha^2 \nabla^2 p$$

where p is the fluid pressure, $\alpha = \sqrt{K/\rho}$ where K is the bulk modulus and $\rho$ is the density of the fluid, and $\ddot{p}$ denotes the second-order time-derivative of p.

3. A method as claimed in claim 1, wherein step (d) comprises determining a first-order derivative of the pressure with respect to the second direction.

4. A method as claimed in claim 1, wherein the first direction is a substantially horizontal direction.

5. A method as claimed in claim 1, wherein the second direction is a substantially vertical direction.

6. A method as claimed in claim 1, wherein step (e) comprises determining $\tilde{p}$, where $$\tilde{p} = \frac{1}{2}\left(p + \frac{1}{ik_z}\partial_z p\right).$$

7. A method as claimed in claim 3, wherein step (d) comprises determining a second-order derivative of the pressure with respect to the second direction from the derivative with respect to time of the fluid pressure and from the derivative with respect to the first direction of the fluid pressure; and using the second-order derivative of the pressure with respect to the second direction to determine the first-order derivative of the pressure with respect to the second direction.

8. A method as claimed in claim 7 wherein the second-order derivative of the pressure with respect to the second direction is determined using the equation $$\partial_{zz} p(x_0, z_0) = \frac{1}{\alpha^2}\ddot{p}(x_0, z_0) - \partial_{xx} p(x_0, z_0).$$

9. A method as claimed in claim 3, wherein step (d) comprises determining the first-order derivative of the pressure in the second direction using the equation:

$$\partial_z p(x_0, z_0) = \frac{p(x_0, z_0)}{h} + \frac{h}{2\alpha^2}\ddot{p}(x_0, z_0) - \frac{h}{2}\partial_{xx}(x_0, z_0) + O(h^2).$$

10. A method as claimed in claim 3, wherein step (d) comprises determining the first-order derivative of the pressure in the second direction using the equation:

$$\partial_z \left(1 - \frac{h^2}{6}\left(\frac{w^2}{\alpha^2} + \partial_{zz}\right)\right) p(x_0, z_0) = \frac{p(x_0, z_0)}{h} - \frac{hw^2}{2\alpha^2} p(x_0, z_0) - \frac{h}{2} \partial_{xx} p(x_0, z_0) + O(h^3).$$

11. A method as claimed in claim 1 wherein step (a) comprises obtaining seismic data at two different depths below the surface of the fluid medium.

12. A method as claimed in claim 11 wherein step (a) comprises measuring the fluid pressure at two different depths below the surface of the fluid medium.

13. A method as claimed in claim 12 and comprising determining the first-order derivative of the pressure in the second direction using the equation:

$$\partial_z p(x_0, z_0) = \frac{p(x_0, z_0 + h/2) - p(x_0, z_0 - h/2)}{h} - \frac{h^2}{24} \partial_{zzz} p(x_0, z_0) + O(h^4).$$

14. A method as claimed in claim 13 wherein step (d) comprises determining $\partial_{zzz} p$ from a derivative with respect to time of the fluid pressure and from a derivative with respect to the x-direction of the fluid pressure.

15. A method as claimed in claim 1 wherein step (a) comprises measuring the fluid pressure and the particle velocity.

16. A method as claimed in claim 15 and further comprising the steps of: computing the particle velocity from the measured values of the pressure; and comparing the results of the computation of the particle velocity with the measured values of the particle velocity.

17. A method as claimed in claim 15 and further comprising the steps of: computing the pressure from the measured values of the particle velocity; and comparing the results of the computation of the pressure with the measured values of the pressure.

18. A method as claimed in claim 15 and comprising the further step of determining the depth of the selected one of the seismic receiver and the seismic source from the measured values of the pressure and the particle velocity.

19. A method as claimed in claim 1, wherein the seismic data is obtained in the vicinity of an array of receivers; and wherein the method comprises using the results of the processing of the seismic data to reduce the effects of seismic energy reflected and/or scattered at the sea surface in the signal emitted by a corresponding array of seismic sources.

20. A method of calibrating a seismic receiver, the method comprising the steps of:
a) measuring the particle velocity using a seismic source and a seismic receiver disposed within a fluid medium;
b) determining a derivative with respect to time of the particle velocity at a point in the vicinity of the receiver;
c) determining a derivative with respect to a first direction of the particle velocity at a point in the vicinity of the receiver;
d) determining a derivative with respect to a second direction of the particle velocity at a point in the vicinity of the receiver from the results of steps (b) and (c); and
e) determining a measure of the quality of the measurement of the particle velocity using the derivative with respect to a second direction of the particle velocity.

21. A method as claimed in claim 20 wherein step (e) comprises determining the curl of the measured particle velocity.

22. A method of determining the depth of a seismic receiver, comprising the steps of:
disposing a seismic receiver in a fluid medium;
measuring the fluid pressure and the particle velocity using the seismic receiver;
determining the distance between the fluid surface and the seismic receiver using an extra degree of freedom resulting from the measured values of the particle velocity and the fluid pressure; and
determining the shape of the seismic receiver using the extra degree of freedom.

* * * * *